Patented Feb. 24, 1953

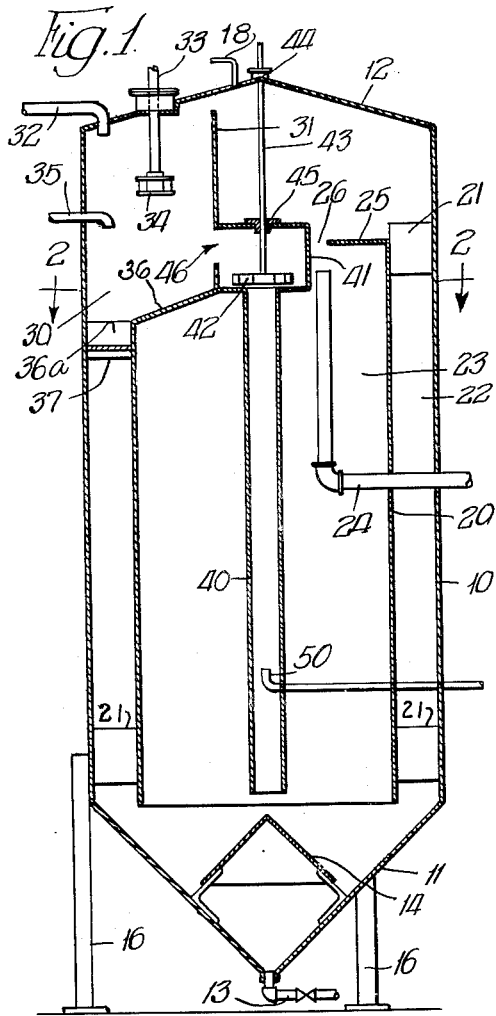
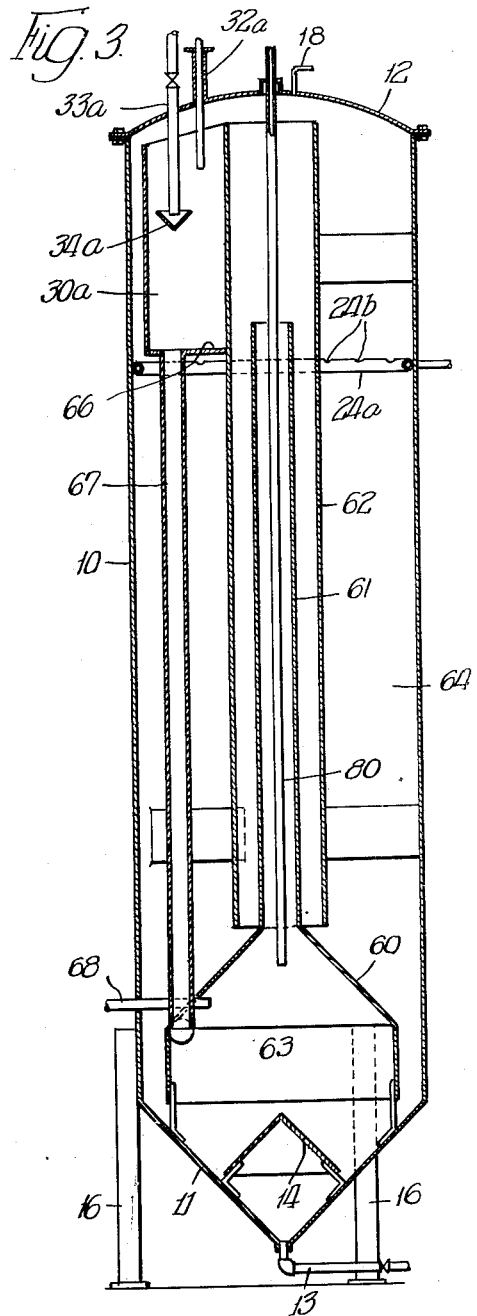
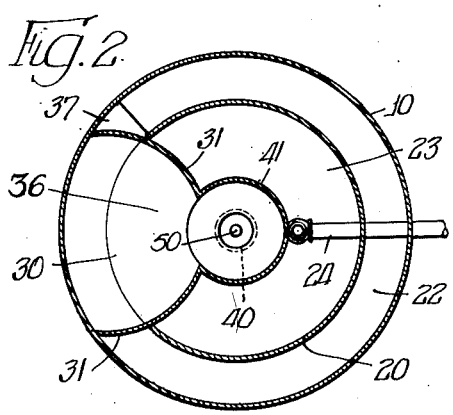
INVENTORS.
Walter H. Green,
BY James M. Kahn.

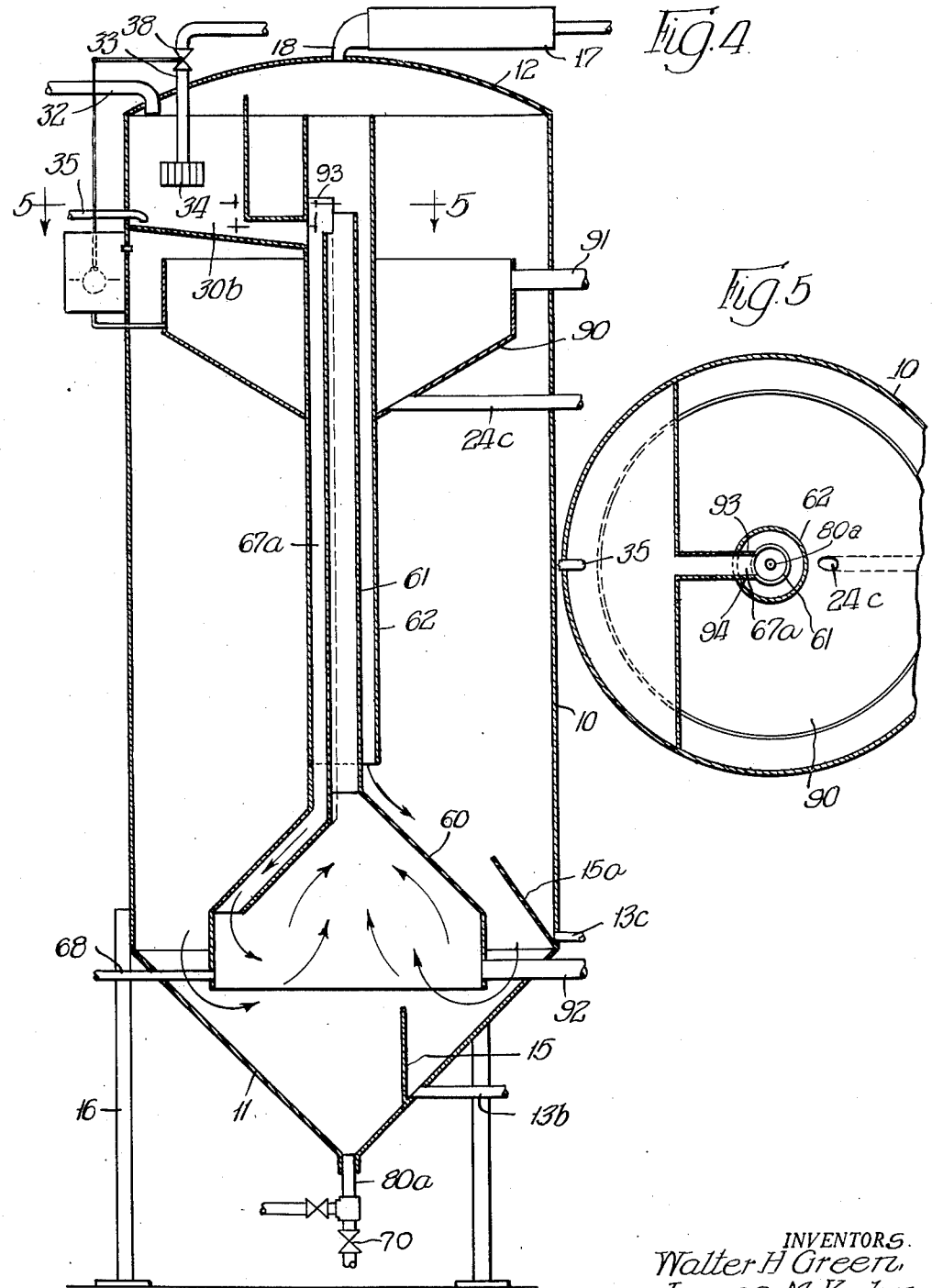

2,629,689

UNITED STATES PATENT OFFICE 2,629,689

WATER PURIFYING AND DEGASIFYING APPARATUS AND PROCESS

Walter H. Green, Batavia, and James M. Kahn, Glencoe, Ill., assignors to Infilco Incorporated, Chicago, Ill., a corporation of Delaware Application April 12, 1948, Serial No. 20,548

17 Claims. (Cl. 210—14)

This invention relates to the softening and deaeration of water, and more particularly to the softening of water by the so-called "hot process" method, in which the water to be treated is heated to a temperature approximating that of boiling water or sometimes higher and the treating reaction takes place while the water is maintained at such temperature.

Hot process softening and deaeration are extensively used in the preparation of boiler feed water and our apparatus and process are especially suitable for providing boiler feed water of proper quality, though their use is not limited thereto.

A primary object of the present invention is to produce an improved process and apparatus for "hot process" water softening, which includes means for maintaining a slurry consisting of unsedimented precipitates from previous reactions in contact with the water undergoing treatment, at a temperature on the order of that of boiling water.

Another object of this invention is to provide a process and apparatus for boiler feed water treatment by "hot process" softening in which the amount of chemicals used is less than heretofore thought necessary.

Another object of this invention is to provide an apparatus and process for more complete softening than heretofore thought possible, in fact, often softening water to such an extent that the dissolved calcium and magnesium is less than the theoretical solubility at the temperature of treatment.

Another object of this invention is to provide apparatus and process for more complete silica removal from water.

Another object of this invention is to effect a slurry recirculation to provide for more favorable physical conditions under which the chemical reactions in softening water take place, and to simultaneously deaerate the water undergoing treatment.

A further object is to provide more complete deaeration by passing steam into the treated water prior to clarification.

Another important object is the maintaining of substantially constant heat in a "hot process" softener.

A still further object of the present invention is to more rapidly and efficiently soften water by the "hot process" method.

These and other objects of the present invention will be more clearly understood from the following specification and description.

It has long been known that softening of water by treatment with chemicals takes place more rapidly at elevated temperatures than at temperatures normally found in the raw water supply. A number of different devices have been proposed for "hot process" softening of water and various chemical treatments have been proposed for the treatment of the water thereby. Most devices of this type comprise a means for heating the water to approximately the boiling point, usually by means of steam, mixing the heated water with the softening reagents, then passing the water thus treated into a sedimentation tank from which softened and clarified water and settled sludge are withdrawn through separate paths. Such devices customarily are of a size to provide a retention period of about one hour, so that at normal flow the water undergoing treatment will be retained therein for such a period. It has been customary to interpose a filter between the "hot process" sedimentation tank and the point of use of the softened water, for, while the process is very efficient as far as softening reactions are concerned, the complete removal of the precipitate so formed by sedimentation has been very difficult. As a matter of fact, while softening reactions take place within a very short time, it is this problem of clarification that requires these devices to provide about one hour retention time. This is due to the fact that while the reactions are practically instantaneous, the solids precipitate in very fine particles which do not agglomerate readily and which settle with difficulty.

It has been suggested that the recirculation of sludge (deposited solids) resulting from previous chemical reactions would aid in settling and effect more complete silica removal. Sludge for recirculation has been collected and stored within the conical bottom section of the treating apparatus and the amount recirculated was customarily from 5% to 15% by volume of the throughput. The recirculation was usually by means of an external centrifugal pump and through relatively narrow pipes. It is well known that the particles of precipitate formed in the process tend to be broken up into fine, hard to settle particles by the turbulence of pumping and by passing through the pump itself and through narrow pipes. The advantage that can be afforded by sludge return is thereby largely offset. Therefore, where we pump water in our apparatus we carefully avoid these drawbacks by using a slow speed rotor and relatively large conduits, or by lifting gently as by a steam lift.

It is also known that solids that have been allowed to settle and are resuspended are not as beneficial for purification as solids which have been held against sedimentation. In our process and apparatus we do not use settled sludge for recirculation, but a slurry comprising particles of precipitate that have been held against sedimentation.

It has also heretofore been customary to deaerate the treated water in a separate compartment provided for that purpose, usually before filtration. In our apparatus and process deaeration is completed together with the softening reactions and no separate compartment for deaeration need be provided.

We have found that if a slurry containing at least about 15% and not more than about 30% by volume of unsedimented solids accumulated from previously treated water and suspended in water undergoing treatment is added in at least equal volume to the incoming water and reagents, several valuable advantages are secured. In the first place, the softening reactions are more complete. In fact, in many instances, the amount of hardness in the treated water is less than the theoretical amount of calcium and magnesium that can be dissolved at that temperature. Another important advantage is that the particles of precipitate (calcium carbonate and magnesium hydrate) formed by the reaction are larger and denser so that the separation of clarified treated water is more rapid, and with less carry-over of suspended solids and a proportionate decrease of the load on the filter. We have also found that in the presence of a relatively large amount of such suspended solids, the amount of silica removal from the raw water is materially increased. Also, in many instances, the amount of treating reagent can be appreciably reduced.

We have also discovered that deaeration is more rapid and complete when the steam is passed into treated water before clarification takes place, i. e. in the presence of solids suspended in the treated water.

The amount of unsedimented solids recirculated for admixture with incoming raw water and chemical reagents is a determining factor in our process, as the value of returned solids has an aggregative effect on the softening reaction up to a certain point and then levels off, and sometimes, actually appears to become objectionable. We have used recirculation ratios up to twenty volumes of slurry to one volume of water, but we have found that usually a recirculation of ratio of a least one volume and not more than fifteen volumes of slurry to one volume of water undergoing treatment gives best results, the ratio being preferably lower for apparatus of the type of Figure 1 and higher for apparatus of the type of Figures 3 and 4.

By a "slurry" we mean a suspension of unsedimented solids previously precipitated and accumulated in water undergoing softening reactions, containing from about 15% to about 30% solids by volume, this being measured by settling the suspension for a period of 5 minutes and noting the proportion between the volume of settled solids and the original suspension.

Briefly, the apparatus of our invention comprises a tank, a chamber in the tank in which the water to be treated is heated by steam to a temperature of approximately 210° F. or more, the chamber preferably being at the top of the tank, a partition structure dividing the tank into a mixing zone and a clarification zone, an outlet for the clarified water from the clarification zone, and means for recirculating slurry from the lower part of the clarification zone to the mixing zone. The means for circulating slurry can take a variety of forms such as a pump, preferably of low speed type, as shown in Figure 1, or a steam lift, as shown in Figures 3 and 4, which causes a circulation sufficient for the purposes desired. The latter form is preferred as it obviously eliminates all moving parts within the treating chamber, and yet when properly designed provides sufficient circulation of slurry to effect the desired results. The use of a steam lift also provides a means for deaeration of the water undergoing treatment at the same time that it provides a satisfactory method of slurry circulation. A further advantage of the use of steam as motive power lies in the fact that the slurry is kept thereby at a constant temperature and heat losses during periods of low flow are practically eliminated. Usually there will also be provided a treated water storage space in the treating tank, as shown in Figure 4.

Our invention will be more fully understood by reference to the drawings, wherein like reference characters designate like parts throughout the various figures and wherein:

Figure 1 represents a vertical cross-sectional view of one form of apparatus constructed in accordance with our invention, wherein a mechanical pumping member is shown for securing the desired circulation;

Figure 2 represents a horizontal cross-sectional view of the apparatus shown in Figure 1, with the rotor removed, and taken substantially along line 2—2 of Figure 1;

Figures 3 and 4 represent vertical cross-sectional views of other embodiments of our invention, in which the required circulation is secured by means of a steam lift; and Figure 5 is a horizontal sectional view substantially along line 5—5 of Figure 4.

The apparatus of our invention may be contained in a basin of any suitable size and shape, but is preferably shown as being in a basin in the form of a cylindrical tank 10 having a hopper bottom 11 and a tightly fitting cover 12. A sludge line 13 may lead from the lower part of said hopper bottom for the removal of solids settling in said tank, as shown in Figures 1 and 3. In such a form it is preferred that a conical hood 14 be supported above sludge line 13 so as to provide a sheltered zone for collection and concentration of solids at the apex of the hopper bottom. If desired, sludge can be concentrated before discharge by taking it from a concentrator 15 or 15a built within the tank, as shown in Figure 4. Tank 10 may be supported in any suitable manner, such as by legs 16, 16.

As usual in the art, a vent condenser 17, such as is diagrammatically shown at 17 in Figure 4, may be provided in the forms of our invention illustrated in Figures 1 and 3. This condenser receives steam vapors from the tank 10 through a vent line 18 leading from the cover 12 and may be of a form well known to those skilled in the art, so need not herein be shown or described in detail.

In the form shown in Figure 1, a cylindrical partition 20 is mounted within the tank 10, by any suitable means, such as brackets 21. This partition, throughout the greater portion of the depth of the tank, divides the tank into two concentric chambers, an outer, or downflow, or mixing chamber 22 and an inner, or upflow, or clarification chamber 23. An effluent conduit 24 leads from the upper portion of the clarification chamber 23 for the withdrawal of treated water. It is understood, of course, that the cylindrical wall 20 will extend to a level above the liquid level established by the effluent conduit 24, so as to prevent short circuiting of the water undergoing treatment, over the top edge of this wall. Preferably a cover plate 25 is affixed to the upper end of wall 20 as shown. A steam vent 26 of any well known form may be located in cover plate 25, so as to equalize steam pressures in the upper portion of the two chambers or zones, 22 and 23.

A raw water heating chamber 30 is provided in the upper portion of the tank 10. Said heating chamber may be of any suitable form and is enclosed by vertically extending partition walls 31, 31. Preferably the raw water is heated by steam and for this purpose a steam line 32 discharges into said heating chamber. Raw water which is to be treated in the apparatus is introduced through the top of said heating chamber through a raw water line 33 under control of suitable valve means (not shown) and preferably is discharged into the heating chamber 30 by means of a spray 34, which is arranged to divide the raw water into fine droplets which may readily be heated by the steam in said heating chamber 30. This spraying of water throughout the steam also partially deaerates the water to be treated, which is of value in securing a properly treated water. Softening reagents may be introduced into the heating chamber 30 by any suitable means such as chemical feed line 35.

A bottom 36 of the heating chamber 30 is inclined downwardly from its inner edge and opens into the outer, or mixing chamber 22, as at 36a. An inclined deflecting plate 37 extending partially along the downflow chamber 22, immediately below the passageway 36a, directs the heated raw water and treating reagent spirally into said downflow chamber. The mixture of heated water and reagent passes spirally down the outer downflow chamber 22 until it reaches the bottom of the lower edge of cylindrical wall 20. A throughput portion of the water then turns and passes upwardly in the inner upflow, or clarification, chamber 23. It will be understood that precipitated solids will tend to accumulate, in suspension, in the lower part of the clarification chamber, or zone 23, and therebelow—forming a thickened slurry in the lower part of the tank. The heavier solids in such slurry can deposit on the sloping walls of the hopper bottom 11 and be withdrawn through sludge blowoff 13.

A circulating conduit 40 leads from the slurry zone in the lower portion of the tank, preferably from a level approximately that of the lower end of wall 20 upwardly through the central chamber to a pumping box 41. To effect the desired circulation through conduit 40 we show, for exemplification in this form of our invention a rotor 42. However, a steam lift, such as shown diagrammatically at 50, and as described in detail in connection with Figure 3, could be used as well to provide the necessary circulation. The rotor 42, which is preferably of slow speed type, is shown as being mounted adjacent the upper end of conduit 40, on a shaft 43. Said shaft may be rotatably driven by any suitable drive means, such as an electric motor (not shown). The shaft 43 can be journaled in suitable bearings 44 and 45 as shown; the former preferably constituting a vapor seal. Rotation of the rotor 42 causes a circulation of liquid through the conduit 40 into the box 41 which is in open communication with the heating chamber 30 through a passageway 46 leading into said chamber. Thus a portion of slurry, i. e. thickened suspension of water undergoing treatment and the precipitated hardness imparting compounds, is withdrawn from the lower portion of the tank through the conduit 40 and discharged into the heating chamber 30. We have found that if at least one volume, based upon normal inflow of raw water, of such slurry, or suspension, is circulated up to the heating chamber a very great improvement is noted in the operation of such apparatus.

It will be obvious that the downflow, or mixing chamber 22, forms a very effective heating jacket for the clarification chamber 23, so that heat losses are minimized. By maintaining the circulation by means of a steam lift, a constant temperature can be maintained even at periods of low flow by the continuous circulation of heated water and slurry. The heat economy of our apparatus is very favorably influenced and the difficulties are avoided which arise when heated water enters a body of cool water in starting operation after a shut-down or slow-down period.

The apparatus shown in Figure 3 illustrates one form of our invention where a steam lift is utilized in place of the mechanical pumping member 42. The structure could be the same as shown in Figure 1 with the substitution of a steam lift for the pumping member 42. However, in order to illustrate the fact that the apparatus of our invention can take a variety of forms to provide additional advantages, we have modified the design somewhat. The two devices are the same in principle but differ somewhat in form. In Figure 3 we also show a cylindrical tank 10 provided with a hopper bottom 11 and fitted with a cover 12. A sludge removal line 13 is provided, which leads from the lower end of the hopper bottom. Preferably the hopper bottom is fitted with a baffle 14 to provide a quiescent or protected sedimentation space for the thickening of solids before removal.

In this form we utilize a hood structure 60 in the bottom portion of the tank, with a draft tube 61 extending upwardly from the open apex thereof to a level slightly above that of the liquid surface in the tank. Surrounding the draft tube 61 is an outer draft tube 62 which extends downwardly from a point near the top of the tank to a point approximately adjacent the top of hood 60. The hood 60 and the draft tube 62 divide the tank into a mixing compartment 63 and an outer quiescent zone or chamber 64, the two draft tubes 61 and 62 affording a passageway from the top of the mixing compartment 63 and discharging into a lower portion of the quiescent outer chamber 64. An effluent line 24a, provided with a plurality of orifices 24b, leads from the upper portion of the quiescent chamber 64, as shown.

In the upper portion of the tank is a heating chamber 30a shown here as open at the top and closed at the bottom as by floor 66. Discharging into the heating compartment 30a are a steam nozzle 32a and a raw water line 33a, the latter being provided with a spraying device 34a. A hot water conduit 67 leads from the bottom of heating chamber 30a and discharges under the hood 60. Treating reagents can be introduced at any desired point, but for purposes of illustration they are shown as being introduced under the hood 60 by means of chemical feed line 68.

A steam line 80 extends into the inner draft tube 61 to a suitable level of submergence and discharges in such a manner as to create a steam lift within draft tube 61. As shown in Figure 3, the line 80 discharges under the hood 60, and where high pressure steam is available this is preferred because it affords some agitation under the hood. However, it will be obvious that the steam can be discharged at a higher level than shown, which permits the use of low pressure steam. The flow of steam from line 80 causes a continuous recirculation of slurry from under the hood 60 upwardly through the inner draft tube, downwardly through the outer draft tube, and discharging in the lower portion of the outer quiescent chamber 64. A portion of the circulating slurry discharged from the outer draft tube is drawn back under the hood, while a throughput portion of clarified water separates from the discharged slurry and flows upwardly toward the effluent pipe 24a.

In many respects a steam lift is preferable to a mechanical pump as it contains no moving parts to get out of order and requires no steam tight packing glands or the like. Such a device as a steam lift is entirely feasible for our purposes as the degree of circulation is not unduly large and steam can supply the necessary lift if supplied under proper conditions. Steam applied for the lift is not used to heat the water as it is applied to water already heated in chamber 30 to approximately the temperature of the steam used for the lift. Therefore, no substantial heat transfer occurs. Furthermore, the steam used as a lift serves to further deaerate the water. The deaeration efficiency by bubbling steam through water is well known, and this efficiency is increased when as here, the water may be subjected to several passes before flowing toward the effluent pipe. The presence of the solids contained in the slurry further enhances the deaeration as these solids constitute nuclei for the formation of air bubbles. We have found that due to the presence of the solids and the prolonged contact of steam and water, deaeration in our apparatus is superior to that which has heretofore been obtained. As the higher pressure steam used as a lift is applied to water which will be approximately of the temperature of the lower pressure steam used for heating the water, any excess heat added to the water by means of the steam lift will be flashed to the raw water heating compartment so there will be little loss of heat by use of the steam lift. As pointed out above, the use of steam in this manner permits the maintaining of a substantially constant temperature in the softener, which is of great importance in the softening of water.

The apparatus shown in Figure 4 is substantially the same as that shown in Figure 3 except for some slight modifications. This figure shows the sludge concentrators 15 and 15a, either one or both of which may be used to collect solids depositing from the slurry for concentration before withdrawal through outlet conduits 13b and 13c, respectively. These concentrators can be placed under the hood 60, as shown at 15, or in the lower portion of the outer clarification space 64 and laterally spaced from, but adjacent the hood 60, as shown at 15a.

In this embodiment of our invention the steam for the steam lift may enter the tank 10 at the apex of the hopper bottom 11 through a pipe 80a. It will be obvious that by discharging the steam in this location the precipitate in the hopper bottom outside the concentrator 15 is held in suspension and prevented from settling in the cone 11.

This form also shows a storage tank 90 affixed to the outer draft tube to provide for the storage of a large volume of treated water, so that sudden high demands of short duration will not affect velocities through the treatment tank. The treated water outlet 24c leads from the lower portion of the chamber 90.

We also provide a filter wash line 91 leading from the top of the storage chamber 90 and a filter wash return line 92 discharging into the lower portion of the hood 60. It is necessary to wash filters associated with "hot process" softening plants with clean and soft water. In the form shown such water can be taken from the top of the storage chamber through the pipe 91 and the dirty water from the filter introduced into the slurry through the pipe 92. During filter washing the rate of withdrawal may exceed the average rate of throughput so that the water overflowing into the storage compartment 90 is not as fully treated as during ordinary operation. However, by withdrawing the wash water from the top of the storage compartment this less completely treated water is used for the washing operation while the fully treated water below the wash water line 91 is available for filtering.

It will be understood from this form of our invention that the water level in the tank 10 must be above the upper edge of the chamber 90 so that during ordinary operation, treated water will be stored to be available when the demand of treated water exceeds the throughput rate. The level in tank 10 may be controlled by any suitable means, such as a float controlled valve 38 on the inlet conduit 33, as shown in Figure 4. Such means are well known in the art and need not herein be shown or described in detail.

It should further be noted that in the apparatus of our invention deaerated water is available for filter washing, thus eliminating any danger of oxygen being introduced into the filter and thence carried into the boiler.

It will also be obvious that due to the improved clarification obtained by the slurry recirculation the load on the filter is materially decreased and filter runs can be longer with corresponding saving in wash water requirements.

In the form of apparatus shown in Figure 4, a conduit 67a leads downwardly from the heating chamber 30b into the hood 60. In this form of our invention, the conduit 67a is formed by two parallel spaced partitions 93 and 94 extending from the inner draft tube 61 to the outer draft tube 62. The conduit 67a is open at its top to receive a portion of the slurry passing upwardly through the inner draft tube 61. The partitions 93 and 94 extend above the upper level of the outlet from the heating chamber 30b (which is adjacent the level of the top of the inner draft tube). This prevents any discharge of liquid from the chamber 30b into said outer draft tube. The conduit 67a is extended below the lower end of the outer draft tube 62, as shown in this figure. Due to this construction, the heated water is thoroughly mixed with circulating slurry before being introduced under the hood 60. The treating reagents can be introduced either into the heating chamber, as through chemical feed line 35 or under the hood, as by chemical feed line 68.

Ordinarily a suitable valved drain, such as is indicated by reference character 70, may be provided to permit draining the entire tank.

To illustrate the operation of our invention we refer to one installation constructed similar to Figure 1 for "hot process" type softening designed to treat 10,000 gallons per hour. The water supply varied somewhat in character, but throughout the period of our tests had a methyl orange alkalinity of about 110 p. p. m. (parts per million), a hardness of 160 p. p. m. and a silica content of approximately 6 p. p. m. Treatment in a conventional hot process softener, that is, without any slurry recirculation, gave a treated water of about 20 p. p. m. hardness, no reduction of silica content, and a reduction in alkalinity to approximately 78 p. p. m. This apparatus was modified to provide for slurry recirculation at various rates. When such slurry recirculation was small (less than 50% by volume of the raw water) no decided improvement in softening or $SiO_2$ reduction could be noted. When the slurry recirculation was increased to about that of the raw water inflow, an improvement in hardness removal was secured from 20 to 18 p. p. m. Upon increasing the slurry return to about 150% of the raw water inflow, there was a further noticeable drop in effluent hardness, namely, to 14 p. p. m., together with a drop in methyl orange alkalinity to about 62 p. p. m. and a reduction in silica to approximately 4 p. p. m. At this rate of recirculation there was no appreciable difference in turbidities of the treated water—with or without slurry recirculation. Thereafter the amount of slurry recirculation was increased to about 185% of the raw water inflow and the hardness dropped to 12 p. p. m., total alkalinity to 60 p. p. m. while total silica remained 4 p. p. m. Upon further increasing the amount of slurry recirculated to between 225 and 250% of the raw water flow no further reduction in hardness was noted in that the effluent hardness was 12 p. p. m., but the silica was further reduced to 2 p. p. m., the total alkalinity of the effluent 54 p. p. m., and turbidities remained low. If more than 250% slurry recirculation was obtained, there was no further reduction in hardness, alkalinity or silica content. However, a very surprising feature of such an increased recirculation was that the turbidity rose to an objectionable degree.

Another feature of this operation was that the requirements of chemicals were considerably reduced. Originally, when operating without slurry return chemical consumption was on the order of 194 pounds of lime and 49 pounds of soda per base charge. During the above mentioned tests it was found that the chemical consumption could be reduced and it was reduced to 148 pounds of lime and 48 pounds of soda ash. In spite of the reduction of chemicals used, the hardness dropped from about 20 p. p. m. under the old method of operation to 12 p. p. m. with slurry recirculation. The silica dropped from 6 p. p. m. to 2 p. p. m. and the total alkalinity was reduced from approximately 78 p. p. m. to 54 p. p. m. The hardness figure is below the theoretical solubility point of calcium and magnesium in water at the operating temperature and this reduction was secured with less chemicals and had the added advantage of reducing alkalinity and silica as well as removing hardness from the water.

Tests were made also on a pilot plant constructed to practice conventional "hot process" softening and modified as in the embodiments here shown. Results using the apparatus of Figure 1, which utilized a mechanically driven pumping member to secure slurry recirculation, gave very satisfactory results. However, there was a tendency for scale to deposit on the pump rotor and there was no complete deaeration resulting from the treatment. Devices constructed according to the plans of Figure 3 and Figure 4 gave somewhat better treating results and had the decided advantage of avoiding mechanical structures which might, in time, require repair. These forms also had the further advantage of deaerating the water undergoing treatment substantially completely. Tests were made to determine the deaerating efficiency of the steam lift. The air content of the treated water was tested by both the standard and a modified form of the Winkler method and both types of tests showed that the dissolved oxygen content of the treated water was less than .005 cc. per litre, or substantially zero. In these forms no objectionable turbidity occurred when quite high recirculation ratios were used. A ratio of 8 volumes of slurry to 1 volume of water to be treated had very favorable results.

These tests indicated that great economic advantage can be secured by modifying the "hot process" of water softening as herein suggested. The tests with the various embodiments show that the apparatus of our invention can take a variety of forms. It will, therefore, be understood that the specification and drawings are to be construed as illustrations of our invention and not as limitations thereon.

We claim:

1. A hot process type water softening apparatus comprising a tank, a partition structure in said tank forming therein a mixing chamber in the lower portion of said tank and a quiescent clarification chamber, a water heating chamber in an upper portion of said tank, a raw water inlet discharging into said heating chamber, a steam inlet into said heating chamber, means for delivering a treating reagent to the water to be treated, outlet means leading from said heating chamber and discharging into said mixing chamber, a passageway leading from the mixing chamber into a lower portion of the quiescent clarification chamber, a second passageway leading from a lower part of the quiescent clarification chamber into the mixing chamber, said mixing chamber, said passageways and said lower portion of said clarification chamber affording a cyclic path for liquid circulation within said tank, inlet means for delivering additional steam to liquid traversing said path of circulation, a treated liquid outlet from the upper part of the quiescent clarification chamber, and a solids outlet from a lower part of said tank.

2. In a hot process type water softening apparatus comprising a closed tank, a partition structure in said tank forming within said tank a mixing chamber and a quiescent clarification chamber, a first passageway between the mixing chamber and the lower portion of the clarification chamber at the lower end of said partition structure, a water heating chamber in an upper portion of said tank, a raw water inlet discharging into said heating chamber, an inlet for steam to said heating chamber, outlet means leading from said heating chamber and discharging to said mixing chamber, a treated liquid outlet from the upper part of the quiescent clarification chamber, and a solids outlet from the lower part of said tank, conduit means forming a second passageway extending vertically within said tank from a level corresponding to a lower portion of said clarification chamber to an elevation within the vertical extent of said heating chamber and in open communication with the lower portion of said clarification chamber at one end, and steam inlet means discharging into a lower portion of said tank for delivering additional steam to liquid traversing said second passageway.

3. In a hot process type water treating apparatus comprising a tank, a partition in said tank forming therein laterally adjacent downflow and upflow chambers, a passageway between said chambers at the lower end of said partition, a treated water outlet from the upper part of said upflow chamber, a solids outlet from the lower part of said tank, a water heating chamber in the upper part of said tank, means for introducing water to be treated into said heating chamber, a steam inlet into said heating chamber, means for introducing a chemical treating reagent to the water to be treated, and a passageway from said heating chamber into the upper part of said downflow chamber, means for deaerating the water prior to clarification including a conduit leading from the lower portion of said tank upwardly to said heating chamber, and a steam inlet discharging into said conduit.

4. A hot process type water treating apparatus comprising a tank, a cylindrical partition in said tank forming therein concentric downflow and upflow chambers, a passageway from the outer chamber into the inner chamber at the lower end of said partition, a water heating chamber in the upper part of said tank, means for introducing steam into said heating chamber, means for introducing water to be treated into said heating chamber, means for introducing a chemical treating reagent to the water to be treated, a passageway from said heating chamber into the upper part of one of said chambers, a conduit means leading from the lower portion of said tank upwardly to said heating chamber, inlet means for introducing steam into said conduit, a treated water outlet from the upper part of the other of said chambers, and a solids outlet from the lower part of said tank.

5. A hot process type water softening and deaerating apparatus comprising a tank, a vertically extending partition structure in said tank forming therein a mixing chamber and a clarification chamber, a treated water outlet from an upper part of said clarification chamber, conduit means leading from the upper part of said mixing chamber upwardly to an elevation adjacent said treated water outlet and then downwardly to a lower portion of said clarification chamber, a water heating chamber in the upper part of said tank, a steam inlet into said heating chamber, means for introducing water to be heated into said heating chamber, a conduit leading from said heating chamber downwardly to said mixing chamber, means for introducing a chemical treating reagent to the water to be softened, a solids outlet from the lower part of said tank, and a steam inlet discharging into a lower portion of said tank, said mixing chamber receiving the steam discharged through said last mentioned inlet.

6. A hot process type water softening apparatus comprising a tank, a partition structure in said tank forming therein a mixing chamber in a lower portion of said tank and a superposed clarification chamber, a clarified water outlet from the upper part of said clarification chamber, conduit means leading from the upper part of said mixing chamber upwardly to an elevation adjacent said clarified water outlet and then downwardly to a lower portion of said clarification chamber, a steam inlet in a lower portion of said tank and discharging upwardly from a point below said conduit means, a water heating chamber in the upper part of said tank, means for introducing steam into said heating chamber, means for introducing water to be heated into said heating chamber, a conduit means leading from said heating chamber downwardly to said mixing chamber, and receiving a portion of the liquid from said first mentioned conduit means, means for introducing a chemical treating reagent to the water to be softened, and a solids outlet from the lower part of said tank.

7. A hot process softener comprising a tank, partition means in said tank forming therein a mixing chamber and a clarifying chamber, a passageway at the lower end of said partition affording communication between said chambers, a vertically extending heating compartment in an upper portion of said tank, an inlet for water to be treated into said heating compartment, means for delivering steam to liquid in said heating compartment, means for delivering a reagent to the water to be treated, a passageway from said heating compartment into said mixing chamber, conduit means extending vertically in said tank from a level corresponding to a lower portion of said clarifying chamber to a level within the vertical extent of said heating compartment and in open communication with said clarifying chamber at its one end, inlet means for delivering additional steam to liquid in said tank at a point in a path including said conduit means, said mixing chamber and the lower portion of said clarifying chamber, treated liquid withdrawal means leading from an upper portion of said clarifying chamber and a solids outlet from a lower portion of said tank.

8. A hot water softening and deaerating apparatus comprising a tank, a partition structure in said tank forming therein a mixing chamber and a clarifying chamber, a heating compartment in an upper portion of said tank, an inlet for water to be treated into said heating compartment, an inlet for heating fluid to said heating compartment, means for delivering reagent to the water to be treated, a conduit leading from said heating compartment to said mixing chamber, treated liquid withdrawal means from an upper portion of said clarifying chamber, a solids outlet from a lower portion of said tank, an inner draft tube leading from the mixing chamber upwardly to an elevation adjacent but above the upper end of said conduit, an outer draft tube surrounding said inner draft tube and leading from adjacent the top of said tank downwardly to the lower portion of the clarifying chamber, and a steam inlet into said tank positioned to discharge steam in such a manner to cause a flow of liquid from said mixing chamber through said draft tubes to the lower portion of said clarifying chamber and back to said mixing chamber.

9. The apparatus of claim 8 comprising also an overflow from said inner draft tube to said conduit.

10. A process of softening and deaerating water comprising establishing and maintaining in the lower portion of a treatment tank a body of slurry comprising solids precipitated and accumulated from previously treated water and held in suspension in water in the process of treatment, establishing within said tank a circulation of slurry through a path leading from said lower portion of said tank to an upper portion of said tank and back to said lower portion, delivering steam into slurry in said path to maintain said circulation, to deaerate said slurry during such circulation and to hold the solids in said body of slurry in suspension, heating incoming liquid in a heating zone, discharging heated liquid and reagent into said body of slurry, withdrawing treated water through a quiescent zone to an outlet at a level in said tank above said body of slurry and separated from said path of circulation, and withdrawing solids from a lower portion of said tank.

11. In the hot process of softening water which includes heating the water to be softened to a temperature of about the boiling point of water, mixing and reacting the heated water with a softening reagent, and separating clarified softened water from the precipitate formed in the reaction, the improvement that comprises accumulating solids precipitated in the water to form a body of slurry comprising unsedimented solids suspended in water undergoing treatment, discharging steam into said body of slurry to establish a steam lift supported circulation of slurry and to hold the solids in said slurry in suspension, and passing the mixture of hot water and softening reagents into said slurry.

12. In a process of softening and deaerating water which includes the steps of establishing and maintaining a body of slurry comprising solids precipitated and accumulated from previously treated water and held in suspension in water under treatment in the lower portion of a tank, heating incoming liquid to be treated and reagent in a heating zone in an upper portion of said tank, introducing the hot mixture of liquid and reagent into said body of slurry, withdrawing treated water from said body of slurry through a quiescent zone to an outlet at a level in said tank above said body of slurry, and withdrawing solids from a lower portion of said tank, the improvement which comprises discharging steam into a lower portion of said body of slurry, thereby establishing a steam lift supported circulation of a stream of slurry from said body of slurry upwardly to the elevation of said heating zone, a portion of said stream being mixed with the heated liquid leaving said heating zone, and another portion returning to said body of slurry separately from said heated liquid.

13. In a process for chemical treatment and deaeration of boiler feed water wherein the water is heated by a first contact with steam in a heating zone, the heated water is reacted with chemicals in a mixing zone, clarified water is separated from solids precipitated by the chemicals in a clarification zone, and deaeration is completed by a second contact with steam, the improvement which comprises effecting said second contact with steam during the period of chemical reaction in said mixing zone and prior to separation of the water from the precipitate formed by such reaction in the clarification zone, and thereafter separating treated and deaerated water from the precipitate in a clarification zone and withdrawing the treated, deaerated water from the process.

14. In a slurry type process for hot softening and deaerating of water the steps of heating and partially deaerating the water in a heating zone, passing the partially deaerated hot water from said heating zone into a mixing zone and mixing it therein with softening reagent and with slurry comprising solids retained from previously treated water and accumulated in suspension in water undergoing treatment, discharging steam into the hot mixture of slurry, reagent and partially deaerated water in sufficient amount to complete the deaeration of the water therein during the period of the chemical reaction and prior to clarification of the water, and thereafter separating softened, clarified, and deaerated water from the slurry in a clarification zone.

15. Apparatus for slurry type hot process softening and deaerating of liquids comprising a tank having a lower slurry holding portion and an upper clarified liquid portion, a clarified liquid outlet from an upper part of said clarified liquid portion, means for withdrawing excess solids from the lower portion of said tank, a heating chamber in an upper portion of said tank at a level above said clarified liquid outlet, an inlet for liquid to be treated into said heating chamber, a steam inlet into said heating chamber, means for introducing reagent to the liquid to be treated, partition means in said tank forming a passageway including an upflow section leading from the slurry holding lower portion of said tank to the elevation of said heating chamber, and a downflow section leading from the elevation of said heating chamber to the slurry holding portion of said tank, inlet means for delivering steam to liquid in said passageway to cause an upward flow of slurry through said upflow section, whereby slurry is circulated through a cyclic path including said slurry holding portion of the tank, said upflow section and said downflow section, and an outlet from said heating chamber discharging into said cyclic path.

16. Apparatus for slurry type hot process softening and deaerating of liquids comprising a tank having therein a lower slurry holding portion and an upper clarified liquid holding portion in open communication one with the other, a clarified liquid outlet from an upper portion of said clarified liquid holding portion, means for withdrawing excess solids from the slurry holding portion of said tank, a heating chamber in an upper portion of said tank at a level above said clarified liquid outlet, an inlet for liquid to be treated into said heating chamber, means for introducing reagent to the liquid to be treated, partition means in said tank forming a passageway having an upflow section leading from the slurry holding lower portion of said tank to the elevation of said heating chamber, and a downflow section leading from the elevation of said heating chamber and discharging into the slurry holding portion of said tank, said upflow section and said downflow section and said slurry holding portion of the tank forming a cyclic path through which slurry may be circulated, an outlet from said heating chamber discharging into said cyclic path, and means in said tank adapted to establish a circulation of slurry through said cyclic path.

17. The apparatus of claim 16, wherein said means for establishing a circulation comprises a steam inlet discharging into said cyclic path.

WALTER H. GREEN.
JAMES M. KAHN.

REFERENCES CITED

The following references are of record in the file of this patent:

UNITED STATES PATENTS

| Number | Name | Date |
|---|---|---|
| 1,030,366 | Winters | June 25, 1912 |
| 1,645,754 | Howell, Jr. | Oct. 18, 1927 |
| 1,922,262 | Ross, Jr. | Aug. 15, 1933 |
| 2,142,515 | Joos | Jan. 3, 1939 |
| 2,241,873 | Yoder | May 13, 1941 |
| 2,263,398 | Robinson | Nov. 18, 1941 |
| 2,355,564 | Sebald | Aug. 8, 1944 |
| 2,379,753 | Sebald | July 3, 1945 |
| 2,442,809 | Hallier | June 8, 1948 |
| 2,500,774 | Sebald | Mar. 14, 1950 |